No. 12,154. REISSUED SEPT. 8, 1903.
A. H. MOSHER.
SAFETY HAIR PIN.
APPLICATION FILED APR. 20, 1903.
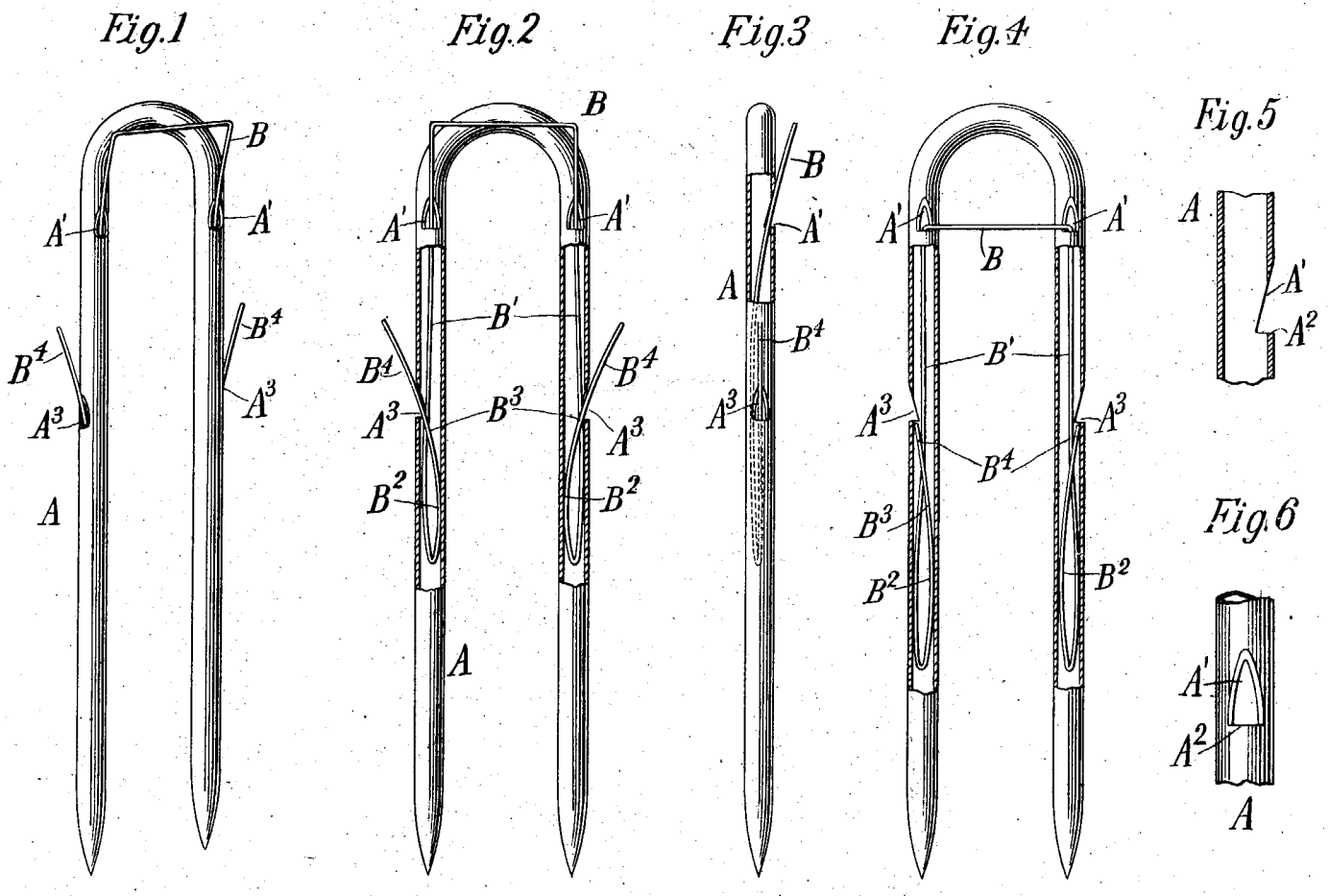
Witnesses:
Henry Barnes
Livingston Fenney
Inventor
Asa Hill Mosher
by Henry D. Williams Att'y No. 12,154. Reissued September 8, 1903.

UNITED STATES PATENT OFFICE.

ASA HILL MOSHER, OF WESTFIELD, NEW JERSEY.

SAFETY HAIR-PIN.

SPECIFICATION forming part of Reissued Letters Patent No. 12,154, dated September 8, 1903.

Original No. 720,601, dated February 17, 1903. Application for reissue filed April 20, 1903. Serial No. 153,574.

*To all whom it may concern:*

Be it known that I, ASA HILL MOSHER, a citizen of the United States, residing at Westfield, in the county of Union and State of New Jersey, have invented a new and useful Safety Hair-Pin, of which the following is a specification.

This invention relates generally to hair-pins, and more particularly to a safety hair-pin, the object of the invention being to provide a device which can be inserted into the hair the same as an ordinary hair-pin and then locked therein, so as prevent the hair-pin working loose, as commonly occurs with hair-pins now in use.

With these objects in view the invention consists, essentially, in providing a hair-pin with a spring-metal fastening device which can be completely withdrawn into the pin for the purpose of inserting the hair-pin into the hair and can then be projected outwardly beyond the pin for the purpose of engaging the hair and preventing the pin working loose, the fastening member being movable rearwardly to cause the locking portion thereof to project outwardly and having a laterally-extending portion and adapted to be engaged and pushed rearwardly into the hair when the hair-pin is inserted into the hair.

The invention consists also in certain details of construction hereinafter fully described, and pointed out in the claims.

In the drawings forming a part of this specification, Figure 1 is a perspective view of a safety hair-pin constructed in accordance with my invention. Fig. 2 is an enlarged detail view, partly in section and partly in elevation, illustrating the construction and arrangement of the locking member. Fig. 3 is a detail side elevation, partly in section, showing the parts in the same position as they occupy in Figs. 1 and 2. Fig. 4 is an enlarged detail, partly in elevation and partly in section, showing the position the parts occupy when the locking member is forced into the pin prior to introducing the pin into the hair. Figs. 5 and 6 are detail views showing the openings produced in the hair-pin.

In carrying out my invention I employ a hair-pin A, essentially U-shaped and preferably constructed of tubular material. This hair-pin A has openings A′ produced in the front of each member near the bow or head of the pin, the lower edges $A^2$ of these openings being abrupt, as most clearly shown in Figs. 5 and 6, the purpose of which will appear hereinafter. Openings $A^3$ are also produced in the outer sides of each member of the pin, the said openings being produced a short distance above the center of the pin. A spring-metal fastening member is arranged for coöperation with the hair-pin, the said spring metal fastening member being preferably constructed of a fine piece of spring-wire B, bent, essentially, in the same form as the hair-pin, the members B′ being arranged parallel and substantially the same distance apart as the members of the pin A. The lower ends of the members B′ are bent back upon themselves, as shown at $B^2$, crossing the members at $B^3$, and are curved outwardly, as shown at $B^4$. The wire is bent in this manner before being connected to the pin, and in order to connect the said wire to the pin ends $B^2$ are introduced into the openings A′ and the spring-metal fastening member forced down into the pin, each member B′ passing down the tubular leg of the pin, and when the wire has been forced down as far as it will go the head or bow portion will rest against the abrupt side $A^2$ of the opening A′. When the fastening member is in this position, the ends or prongs will be completely retained within the pin, and the pin can then be introduced into the hair. After the pin has been placed in the hair the head or bow portion of the fastening member is drawn upwardly, and the prongs or outwardly-curved ends $B^4$ will be projected through the side openings $A^3$, producing laterally-projecting prongs at each side of the hair-pin, which serve to retain the pin in its proper position and prevent it working loose in the hair. It will also be noted by reference to Fig. 4 that the cross-piece or laterally-extending portion of the pin will contact with the hair and as the hair-pin is pushed into the hair, and this contact with the hair will in itself force the laterally-extending portion of the fastening member rearwardly, and thereby project the prongs out of the pin proper at each side. When it is desired to remove the hair-pin, the fastening member is again forced into the pin, as shown in Fig. 4, and the pin can then be removed the same as the ordinary hair-pin.

The simplicity of the device renders it cheap and easy of both construction and manipulation.

It is obvious that various modifications may be made in the configuration and construction shown and above particularly described within the spirit and scope of my invention.

Having thus fully described my invention, what I claim as new, and desire to secure by Letters Patent of the United States, is—

1. The combination, with a pin, of a fastening member having a locking portion and a portion extending laterally a substantial distance from the pin so as to be operated by the resistance to the insertion of the pin, such laterally-extending portion being located, when in forward position, in advance of the rear end of the pin, and being in such forward position with the locking portion in retreated position and being movable rearwardly relatively to the pin to project the locking portion.

2. The combination, with a pin having prongs spaced apart, of a fastening member having locking-arms on such prongs and a laterally-extending portion bridging the space between the prongs of the pin and joining the locking-arms and located, when in forward position, in advance of the rear end of the pin and being in such forward position with the locking portion in retreated position and being movable rearwardly relatively to the pin to project the locking portion.

3. The combination, with a pin, having tubular prongs spaced apart, of a fastening member having locking-arms located in the tubular prongs and a laterally-extending part bridging the space between such locking-arms and joining the locking-arms, the tubular prongs of the pin having openings for the emergence at all times of the laterally-extending portion of the fastening member and also having openings for the emergence of the locking-arms when in projected position, the laterally-extended portion being in forward position with the locking-arms in retreated position and being movable rearwardly relatively to the pin to project the locking-arms.

4. In a hair-pin, the combination with the tubular members having a plurality of perforations, of a wire member inserted in the upper perforations, its ends extending downwardly in said tubular members, respectively, then bent back upon themselves bearing against the sides of the tubular members opposite the sides containing the lower perforations, and then crossed over to the said opposite side, said ends resting when in their lowermost position immediately below said lower perforations and adapted to be projected through them when the wire member is drawn upward and to be held in either position by the frictional contact of the bent portions with the sides of the tubular members.

ASA HILL MOSHER.

Witnesses:
HERBERT H. GIBBS,
HENRY D. WILLIAMS.